United States Patent
Dong et al.

(10) Patent No.: US 10,641,001 B2
(45) Date of Patent: May 5, 2020

(54) COLUMN FIXING DEVICE FOR FROST PREVENTION MACHINE AND INSTALLATION METHOD THEREOF

(71) Applicant: JiangSu University, Jiangsu (CN)

(72) Inventors: Lili Dong, Jiangsu (CN); Yongguang Hu, Jiangsu (CN); Zhen Wang, Jiangsu (CN)

(73) Assignee: JiangSu University, Jiangsu (CN)

( * ) Notice: Subject to any disclaimer, the term of this patent is extended or adjusted under 35 U.S.C. 154(b) by 0 days.

(21) Appl. No.: 16/300,040

(22) PCT Filed: Apr. 21, 2017

(86) PCT No.: PCT/CN2017/081393
§ 371 (c)(1),
(2) Date: Nov. 8, 2018

(87) PCT Pub. No.: WO2017/193793
PCT Pub. Date: Nov. 16, 2017

(65) Prior Publication Data
US 2019/0145121 A1    May 16, 2019

(30) Foreign Application Priority Data
May 9, 2016 (CN) .......................... 2016 1 0297763

(51) Int. Cl.
*E04H 12/22* (2006.01)
*A01G 13/08* (2006.01)

(52) U.S. Cl.
CPC ......... *E04H 12/2215* (2013.01); *A01G 13/08* (2013.01); *E04H 12/2261* (2013.01)

(58) Field of Classification Search
CPC ............ E04H 12/2215; E04H 12/2261; E04H 12/2292; E04H 12/2269; A01G 13/08; E02D 27/42
See application file for complete search history.

(56) References Cited

U.S. PATENT DOCUMENTS 5,632,464 A * 5/1997 Aberle ................ E04H 12/2269
248/530
7,506,775 B2 * 3/2009 Hartzell .............. E04H 12/2253
211/107
(Continued)

FOREIGN PATENT DOCUMENTS

CN    202282965    6/2012
CN    105935034    9/2016
(Continued)

OTHER PUBLICATIONS

Hu et al., "System Design and Experiment on Elevated Wind Machine for Tea Frost Protection", Transactions of the Chinese Society for Agricultural Machinery, Dec. 2007, pp. 97-99, 124.

(Continued)

*Primary Examiner* — Gisele D Ford
(74) *Attorney, Agent, or Firm* — JCIPRNET

(57) ABSTRACT

A column fixing device for frost prevention machine includes a connecting support, a pedestal, and pedestal bolt. The connecting support is composed of an anti-tilting guide barrel, a fixed pillar, a rib plate, and a connecting plate. The pedestal is composed of pedestal plates spliced to each other, and adjacent pedestal plates are connected via double-end studs. The pedestal bolt is used for fixedly connecting the connecting support with the pedestal. The pedestal is hit into soil to fix the pedestal, and then the frost prevention machine is fixed through the pedestal and the connecting support so as to overcome the difficulty and low efficiency of digging small-diameter installation deep holes required for high precision.

6 Claims, 6 Drawing Sheets

(56) References Cited

U.S. PATENT DOCUMENTS

| | | | | |
|---|---|---|---|---|
| 2011/0247263 | A1* | 10/2011 | Hu | A01G 13/08 47/2 |
| 2013/0312340 | A1* | 11/2013 | Miller | E04H 12/22 52/169.13 |
| 2016/0097209 | A1* | 4/2016 | Angelo | E04G 23/0229 52/297 |
| 2017/0284120 | A1* | 10/2017 | White | E04H 12/2215 |

FOREIGN PATENT DOCUMENTS

| | | |
|---|---|---|
| DE | 102012200860 | 7/2013 |
| FR | 2626058 | 7/1989 |
| JP | H08242707 | 9/1996 |
| JP | H10136803 | 5/1998 |

OTHER PUBLICATIONS

"International Search Report (Form PCT/ISA/210)", dated Jul. 12, 2017, with English translation thereof pp. 1-5.

\* cited by examiner

COLUMN FIXING DEVICE FOR FROST PREVENTION MACHINE AND INSTALLATION METHOD THEREOF

CROSS-REFERENCE TO RELATED APPLICATION

This is a 371 application of the International PCT application serial no. PCT/CN2017/081393, filed on Apr. 21, 2017, which claims the priority benefits of China Application No. 201610297763.6, filed on May 9, 2016. The entirety of each of the above-mentioned patent applications is hereby incorporated by reference herein and made a part of this specification.

BACKGROUND

Technical Field

The present invention relates to a device for the frost prevention machine column, which specifically relates to the fixed device and method of a column of frost prevention machine used in tea (fruit) garden, which belongs to the field of agricultural machinery and technology.

Description of Related Art

China has a long history of tea planting and drinking. The growth and development of tea trees requires a warm and moist climate. The germination of tea buds in early spring is easy to be affected by cold spell in later spring, which reduces quality and production of the tea. In recent years, research on tea tree frost prevention technology has been carried out rapidly in China. The research shows that the frost prevention effect can be achieved by using the frost prevention machine to conduct airflow disturbance from top to bottom.

At present, the commonly used fixing methods of the frost prevention machine column are as below. (1) Digging a pit with a certain depth in a position where the frost prevention machine is installed in a manual way. Pouring concrete in the pit, and a top of the concrete is provided with anchor bolt. A column bottom flange is fixed on a foundation of the concrete by the anchor bolt. The disadvantage of this method is that labor intensity is high, and installation efficiency of the frost prevention machine is low. (2) Use tools to dig the pit with a certain depth and a diameter slightly larger than a diameter of the column in the location where the frost prevention machine is installed. The frost prevention machine column is placed in the pit with a body of the column being kept upright, and is buried via filling of soil or concrete after adjusting the direction. The disadvantage of this method is that: in order to guarantee working requirement of the column, the pit can only has the diameter slightly larger than that of the column, such that in late burying, a gap between soil and column is hard to eliminate. The gap will further increase due to vibration and wind generated from the frost prevention machine in the process of using machine, and this severely reduces safety usage of the frost prevention machine performance and work efficiency To solve the problem of high labor intensity and low efficiency of digging the pit, the present invention provides the base plate punched into the soil to replace the deep pit fixing frost prevention machine, which greatly reduce the labor intensity and improves the installation efficiency of the frost prevention machine. In addition, Chinese utility model patent CN201120394200.1 discloses a fixing device for a stand column of a frost prevention machine for plant, which includes several root stand mechanisms disposed at a bottom of the stand column. The root stand mechanisms include a steel root beam formed by a metal sheet beam transversely bent into trough type, and a U-shaped hoop. A pair of positioning rods is disposed on a middle of the steel root beam. A lower part of the column is positioned between a bunch of positioning rod, which are fixed vertically to the steel rot beam through the U-shaped hoop. This method requires digging larger and deeper pits, which increase the labor intensity and requirement of installation of the device itself is high and cost is relatively high. The common feature of the above method is that it is necessary to dig a small diameter and high precision deep pit in the installation position of frost prevention machine, and it is labor intensive, time consuming and costly. The present invention adopts the method of driving the base plate to insert into the soil to avoid the work of digging deep pits, thus it reduces the labor intensity, and improve the installation efficiency of the frost prevention machine. The height of frost prevention machine to the ground needs to reach 6.7 m to meet the frost prevention effect of frost prevention machine. Non-standard pipe is adopted in the conventional frost prevention machine column since the standard length of the pipe is 6 m, which has a high cost. The use of the connecting support provided by the present invention can make the frost prevention machine column adopt standard pipe material, which can save 50% of the fabricating cost.

SUMMARY

The purpose of the present invention is to provide a column fixing device for a frost prevention machine and its usage method, which has simple structure and is convenient in installation for reducing labor intensity and installation time of the frost prevention machine, and for effectively preventing sink, rotation, and tilt of the frost prevention machine column, thereby saving manufacturing and material costs, and transportation and storage are also convenient.

The technical solutions of the present invention are as follows.

A column fixing device for frost prevention machine includes a frost prevention machine, a connecting support, a pedestal, and a pedestal bolt. The connecting support includes an anti-tilting guide barrel, a fixed pillar, a rib plate, and a connecting plate. An outer diameter of the anti-tilting guide barrel is 0.5 millimeters-1 millimeter smaller than an inner diameter of the frost prevention machine column and an inner diameter of the fixed pillar. Two ends of the anti-tilting guide barrel are provided with chamfer to facilitate installation of the anti-toppling guide barrel and the frost prevention machine. The frost prevention machine 1 is mounted on an upper end of the connecting support. A lower end of the frost prevention machine column has several small holes for plug welding of the anti-tilting guide barrel of the connecting support. The anti-tilting guide barrel is installed into the fixed pillar 22 and into the frost prevention column with a length of more than 200 millimeters, and is fixed by the method of plug welding, so as to enhance its anti-dumping ability. An outer diameter of the fixed pillar is equal to an outer diameter of the frost prevention machine column. Holes on an upper end of the fixed pillar are used for plug welding. An outer edge of the connecting plate has four notches, and the pedestal bolt connects the connecting support and the pedestal through the notch. During the assembly, the anti-tilting guide barrel is first installed into the upper end of the fixed pillar with a length of more than 200 millimeters, the anti-tilting guide barrel and the fixed pillar are fixed by plug welding. The fixed pillar is welded vertically in a center of the connecting plate, and the rib plate is welded between the fixed pillar and the connecting plate to enhance anti-torsion ability of the frost prevention machine. The pedestal includes pedestal plates spliced to each other, and adjacent pedestal plates are connected via double-end studs. Dig a shallow pit in corresponding position when installing pedestal. Each of the pedestal plates is punched into the soil with a length of 20 millimeters-30 millimeters successively after location of each of the pedestal plates is determined. Using the double-end studs to connect adjacent pedestal plate when the L-shaped hole is closed to the ground. The double-end studs should have 20 millimeters-30 millimeters living space in a horizontal direction after installation, so as to beneficial the pedestal plate to be punched into the soil successively. After that, the pedestal is completely punched into the soil. The connecting support is fixed on the pedestal by using pedestal bolt in a symmetrical installation after the installation of the pedestal is completed. The connecting plate is buried with soil after installation of the pedestal bolt, thus it is safe and beautiful. Finally, the frost prevention machine column is sleeved on the anti-tilting guide barrel. The anti-tilting guide barrel and the frost prevention machine column are fixed by the method of plug welding.

Preferably, a cross-section shape of the fixed parts is rectangular.

Preferably, number of the pedestal bolts is four.

Preferably, number of the double-end studs is eight.

Preferably, fixing methods between the anti-tilting guide barrel and the fixed pillar, and between the anti-tilting guide barrel and the frost prevention machine column are plug welding.

The column fixing device for frost prevention machine in the present invention has the advantage of simple structure and convenient installation, it not only reduce the labor intensity installing, raises the anti-torsion ability and anti-dumping ability, and increases the work reliability of the frost prevention machine. The use of connecting supports enables the standard pipe material to replace the non-standard pipe material, which was originally used to meet the height of the frost prevention machine, thereby greatly saving nearly 50% of the fabricating cost, and facilitate transportation and storage. At the same time, installation efficiency and economic benefits of the frost prevention machine are improved.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
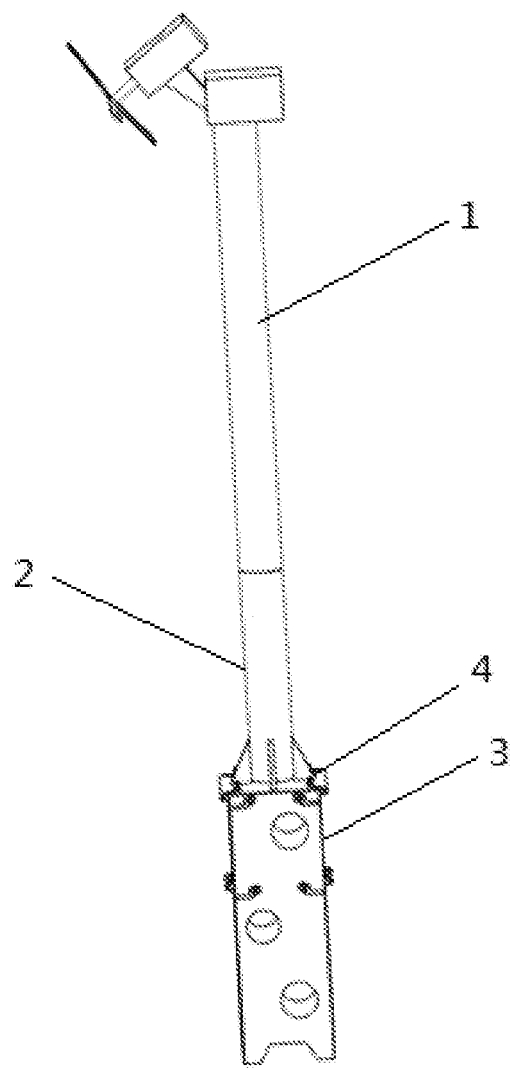
FIG. 1 is a schematic overall installation structure view of a frost prevention machine according to the present invention.
Figure 1A:
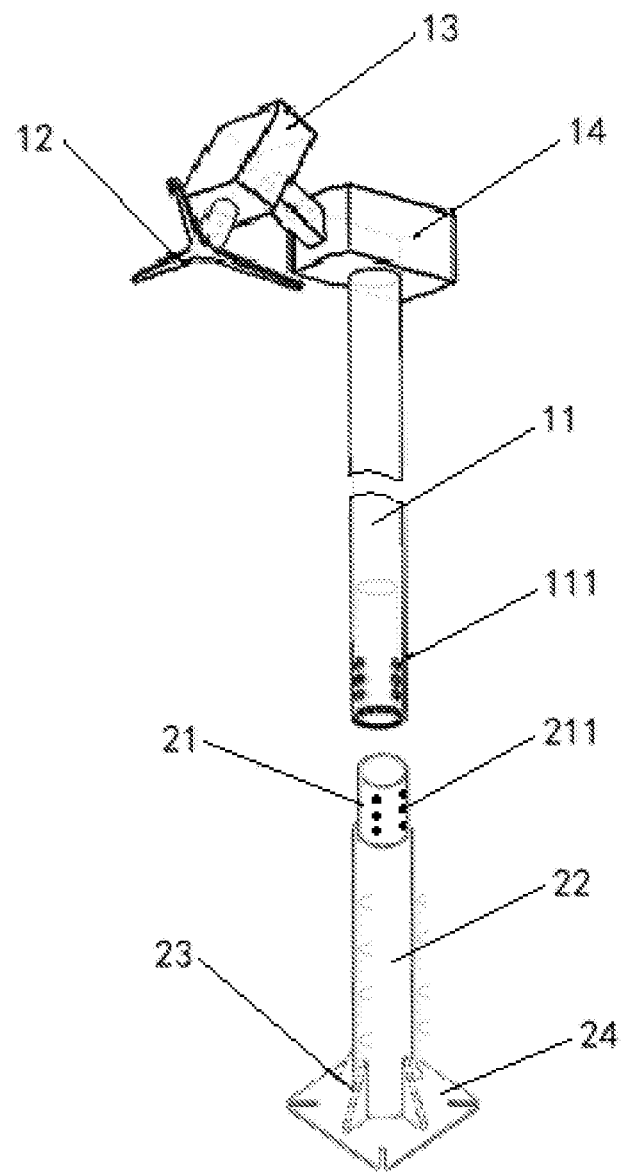
FIG. 1A is a partially exploded view of the frost prevention machine and a connecting support according to the present invention.

Referring to FIG. 1 and FIG. 1A, a column fixing device for frost prevention machine includes a connecting support 2 and a pedestal 3. The combined installation method meets height requirement and reliability requirement of the frost prevention machine. The frost prevention machine 1 is mounted on an anti-tilting guide barrel 21 of the connecting support 2 by a frost prevention machine column 11. The frost prevention machine 1 is fixed to the connecting support 2 by plug welding. The connecting support 2 and the pedestal 3 are fixed by the pedestal bolt 4.

Figure 2:
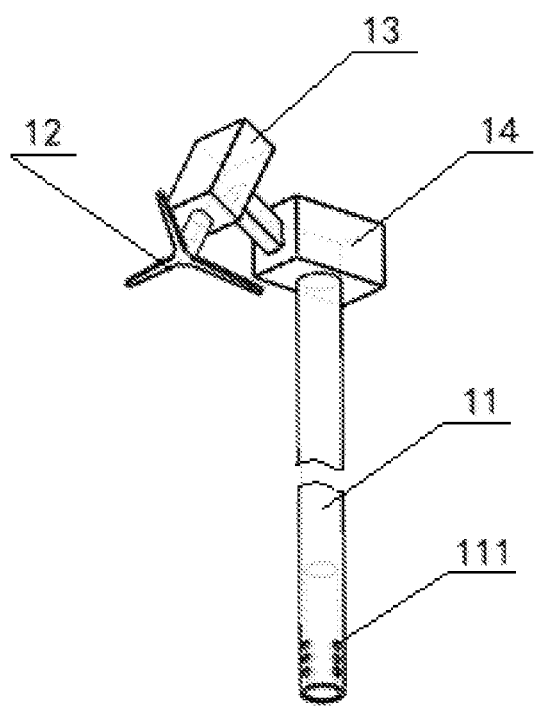
FIG. 2 is a schematic structure view of the frost prevention machine according to the present invention.
Figure 3:
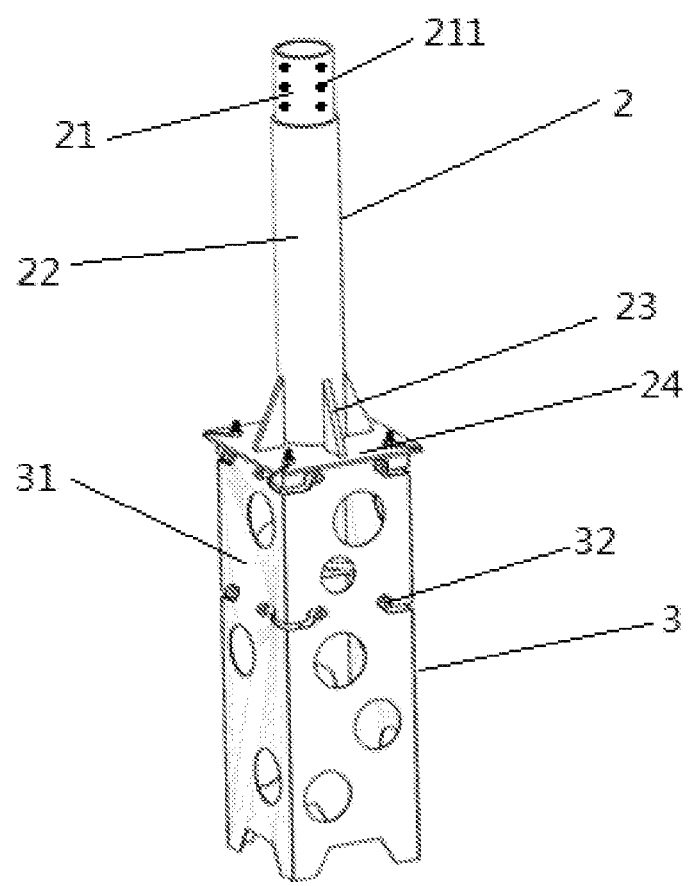
FIG. 3 is a schematic installation structure view of a connecting support and a pedestal plate according to the present invention.

Referring to FIG. 2, the frost prevention machine includes a frost prevention machine column 11, a frost prevention machine blade 12, a frost prevention machine motor 13, and a frost prevention machine connection part 14. The frost prevention machine column 11 is a standard pipe with a length of 6 m.

Figure 4:
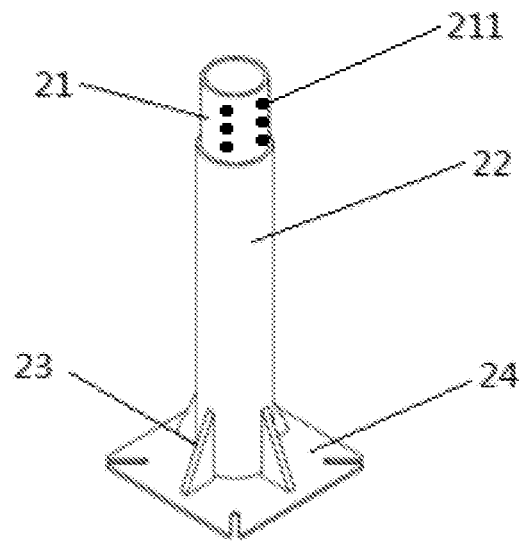
FIG. 4 is a schematic structure view of the connecting support according to the present invention.

Referring to FIG. 4, the connecting support 2 includes an anti-tilting guide barrel 21, a fixed pillar 22, a rib plate 23, and a connecting plate 24 fixed to each other. An outer diameter of the anti-tilting guide barrel 21 is 0.5 mm-1 mm smaller than an inner diameter of the fixed pillar 22. Upper end of the fixed pillar 22 has 2 or 3 groups of small holes. Firstly, the anti-tilting guide barrel 21 is inserted into an upper end of the fixed pillar 22 around 200 mm. The anti-tilting guide barrel 21 and the fixed pillars 22 are fixed by plug welding. Secondly, the fixed pillar 22 is welded vertically in a center of the connecting plate 24, and then the rib plates 23 is welded between the fixed pillar 22 and the connecting plate 24 to enhance anti-dumping ability of the fixed pillar 22.

Figure 5:
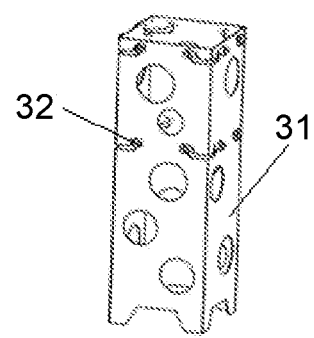
FIG. 5 is a schematic installation structure view of the pedestal plate according to the present invention.
Figure 6:
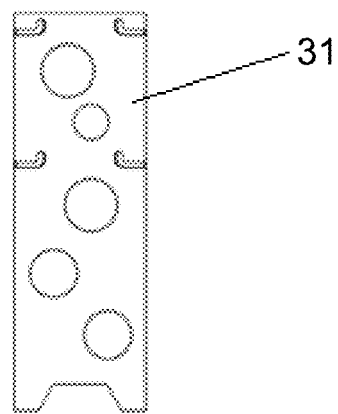
FIG. 6 is a schematic structure view of the pedestal plate according to the present invention.

Referring to FIG. 5 and FIG. 6, the pedestal 3 includes pedestal plates 31 spliced to each other. There are several L-shaped holes at an upper end edge of the pedestal plate 31. The L-shaped holes are used for installation of the double-end studs 32. The L-shaped holes can ensure the reliability of connection between the double-end studs 32 and the pedestal plate 31 when the pedestal plate 31 is punched into soil.

Figure 7:
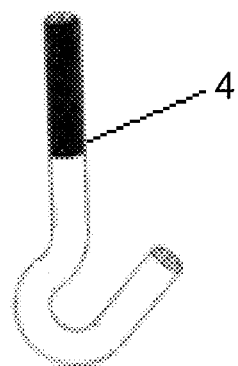
FIG. 7 is a schematic structure view of a pedestal bolt according to the present invention.

Referring to FIG. 7, a bottom end of the pedestal bolt 4 hooks the double-end studs 32 on an upper end of the pedestal 3. The connecting support 2 and the pedestal 3 are fixed by the pedestal bolt 4.

The invention is further described below with reference to the concrete implementation examples. However, the protective range of this present invention includes but not limited to that.

The column fixing device for frost prevention machine according to the present invention can overcome difficulties of high precision of digging aperture, deep pit with a small diameter and the backfill compaction in the commonly-used fixed installation methods of the frost prevention machine, by punching the pedestal into the soil, thereby reducing labor intensity and improving installation efficiency. The use of connecting support enables standard pipe to replace the conventional non-standard pipe, which was originally used to meet the height of the frost prevention machine, thereby greatly saving fabricating costs, and facilitate transportation and storage. The hole in the pedestal plate connects the soil inside and outside of the pedestal into a whole, which enhances stability of the pedestal and reduces damage to the soil. The present invention provides a column fixing device for the frost prevention machine.

During installation of the frost prevent machine, first dig a shallow pit at a pre-installed position of the frost prevention machine, and the pedestal plates 31 spliced to each other into a rectangle. Each of the pedestal plates 31 is punched into the soil 20 millimeters-30 millimeters successively after location of the pedestal plates 31 is determined to guarantee relative positions between the pedestal plates 31. The double-end studs 32 are installed in the L-shaped holes when the L-shaped holes on an upper end of the pedestal plate 31 are close to the ground. The installed double-end studs 32 should have 20 millimeters-30 millimeters living space in a horizontal direction. Continue punching until the pedestal plate 31 is punched into the soil. The pedestal plates 31 are taut with each other under affection of the soil and the double-end studs 32 when the pedestal 3 is punched into the soil. The double-end studs 32 are installed in the L-shaped holes when the L-shaped holes 32 on an uppermost end of the pedestal plate 31 is close to the ground, a lower end of the pedestal bolt 4 is hooked on the double-end studs 32, the connecting support 2 is fixed on the pedestal 3, and adjusts a position of the connecting support 2. An upper end of the pedestal bolts 4 is disposed in the notch of the edge of the connecting plate 24, and the nut is sleeved on the upper end of the pedestal bolt 4 and is pre-tightened. Afterwards, the connecting plate 24 is buried with soil to level the land. The lower end of the frost prevention machine column 11 has 2 or 3 groups small holes 111, and the upper end of the anti-tilting guide barrel 21 has plug weld areas 211 respectively corresponding to the holes 111. The frost prevention machine column 11 is sleeved on the anti-tilting guide barrel 21 that is on the upper end of the connecting support 2, and the anti-tilting guide barrel 21 and the frost prevention machine column 11 are fixed by the means of plug welding. The outer diameter of the anti-tilting guide barrel 21 is 0.5 millimeters-1 millimeter smaller than the inner diameter of the frost prevention machine column 11 and the inner diameter of the fixed pillar 22, to raise the anti-bending ability, anti-dumping ability and anti-torsion ability, at the same time reduce vibration. The outer diameter of the frost prevention machine column 11 is equal to the outer diameter of the fixed pillar 22, thus making the appearance beautiful.

The embodiments are preferred implementation manners of this present invention. However, this present invention includes but not limited to the foregoing implementation manners. Any obvious improvements, replacements or variations that can be made by a person skilled in the art without departing from the substantial content of the present invention fall within the protection scope of the present invention.

What is claimed is:

1. A column fixing device adapted for a frost prevention machine, the column fixing device comprising a connecting support, a pedestal, and a pedestal bolt, wherein the connecting support is composed of an anti-tilting guide barrel, a fixed pillar, a rib plate, and a connecting plate, the pedestal is composed of a plurality of pedestal plates spliced to each other, and adjacent pedestal plates are connected via double-end studs; the pedestal bolt is used for fixedly connecting the connecting support and the pedestal, wherein the pedestal plates respectively have L-shaped holes at an edge thereof, an adjacent two of the pedestal plates are connected via the double-end studs through the L-shaped holes; the double-end studs will not slide out of the L-shaped holes under an upward resistance of soil when the pedestal is punched into the soil, and the double-end studs will tightly couple the adjacent two of the pedestal plates together.

2. The column fixing device for frost prevention machine according to claim 1, wherein an outer diameter of the anti-tilting guide barrel is 0.5 millimeters-1 millimeter smaller than an inner diameter of a frost prevention machine column and an inner diameter of the fixed pillar, an outer diameter of the fixed pillar is equal to an outer diameter of the frost prevention machine column.

3. The column fixing device for frost prevention machine according to claim 2, wherein two ends of the anti-tilting guide barrel are provided with chamfer to facilitate installation of the anti-tilting guide barrel and the frost prevention machine; the anti-tilting guide barrel is installed into the fixed pillar and into the frost prevention machine column with a length of more than 200 millimeters by plug welding, and the frost prevention machine column has more than 2 groups of plug holes.

4. The column fixing device for frost prevention machine according to claim 1, wherein a cross-section of the pedestal is triangle, rectangle or pentagon.

5. The column fixing device for frost prevention machine according to claim 1, wherein a plurality of circular holes with different sizes are provided on the pedestal plates, when the pedestal is punched into the soil, a part of the soil inside the pedestal and another part of the soil outside the pedestal are integrated via the circular holes.

6. An installation method for the column fixing device according to claim 1, the installation method comprising following steps:
digging a pit at a position of the frost prevention machine;
punching each of the pedestal plates into the soil 20 millimeters-30 millimeters relative to a ground after location of each of the pedestal plates is determined;
when the L-shaped holes on an upper end of each of the pedestal plates are close to the ground, installing the double-end studs at the L-shaped holes of the adjacent pedestal plates, wherein the double-end studs are movable within 20 millimeters-30 millimeters in a horizontal direction;
inserting the anti-tilting guide barrel into the fixed pillar with a length of 200 millimeters, fixing the anti-tilting guide barrel and the fixed pillar by plug welding, welding the fixed pillar at a center of the connecting plate, and welding the rib plate between the fixed pillar and the connecting plate;
fixing the connecting support on the pedestal by the pedestal bolt;
filling up the pit with the soil to level the ground surrounding thereof; and
sleeving the frost prevention machine column on the anti-tilting guide barrel, and fixing the frost prevention machine column and the anti-tilting guide barrel by plug welding.

\* \* \* \* \*